(12) United States Patent
McGovern et al.

(10) Patent No.: US 8,543,515 B2
(45) Date of Patent: Sep. 24, 2013

(54) SYSTEM AND METHOD FOR SOCIAL RECRUITING

(75) Inventors: Robert McGovern, Chevy Chase, MD (US); Richard Ellinger, Great Falls, VA (US); Matthew Hagopian, McLean, VA (US); Jonathan Krosschell, Vienna, VA (US); Margaret Padalino, Herndon, VA (US)

(73) Assignee: Career Management Solutions, LLC, King of Prussia, PA (US)

( * ) Notice: Subject to any disclaimer, the term of this patent is extended or adjusted under 35 U.S.C. 154(b) by 0 days.

(21) Appl. No.: 13/400,961

(22) Filed: Feb. 21, 2012

(65) Prior Publication Data

US 2012/0330822 A1   Dec. 27, 2012

Related U.S. Application Data

(60) Provisional application No. 61/446,813, filed on Feb. 25, 2011.

(51) Int. Cl.
*G06Q 10/00*   (2012.01)

(52) U.S. Cl.
USPC ............................................. 705/321; 705/10

(58) Field of Classification Search
USPC .................................................. 705/321, 10
See application file for complete search history.

(56) References Cited

U.S. PATENT DOCUMENTS

| | | | |
|---|---|---|---|
| 5,164,897 A | 11/1992 | Clark et al. |
| 5,224,173 A | 6/1993 | Kuhns et al. |
| 5,416,694 A | 5/1995 | Parish et al. |
| 5,592,375 A | 1/1997 | Salmon et al. |
| 5,681,046 A | 10/1997 | Lawrence |
| 5,754,939 A | 5/1998 | Herz et al. |
| 5,832,497 A | 11/1998 | Taylor |
| 5,884,270 A | 3/1999 | Walker et al. |
| 5,918,207 A | 6/1999 | McGovern et al. |
| 5,963,951 A | 10/1999 | Collins |
| 6,049,776 A | 4/2000 | Donnelly et al. |
| 6,052,122 A | 4/2000 | Sutcliffe et al. |
| 6,115,709 A | 9/2000 | Gilmour et al. |
| 6,126,448 A | 10/2000 | Ho et al. |
| 6,144,964 A | 11/2000 | Breese et al. |
| 6,154,753 A | 11/2000 | McFarland |
| 6,213,780 B1 | 4/2001 | Ho et al. |
| 6,272,467 B1 | 8/2001 | Durand et al. |
| 6,275,812 B1 | 8/2001 | Haq et al. |
| 6,289,340 B1 | 9/2001 | Puram et al. |
| 6,301,579 B1 | 10/2001 | Becker |
| 6,370,510 B1 | 4/2002 | McGovern et al. |
| 6,385,620 B1 | 5/2002 | Kurzius et al. |
| 6,405,197 B2 | 6/2002 | Gilmour |
| 6,457,005 B1 | 9/2002 | Torrey |

(Continued)

OTHER PUBLICATIONS

K&L Gates LLP, Dec. 21, 2009 Regarding U.S. Published Application No. 20090228297.

(Continued)

*Primary Examiner* — Samica L Norman
(74) *Attorney, Agent, or Firm* — Pepper Hamilton LLP

(57) ABSTRACT

A system for social recruiting including an employment system server including a user database, where the user database includes a recruiter profile and a job seeker profile, and a recruiter network for the recruiter profile includes the recruiter profile associated with the job seeker profile.

13 Claims, 18 Drawing Sheets

(56) References Cited

U.S. PATENT DOCUMENTS

| | | | |
|---|---|---|---|
| 6,564,188 B2 | 5/2003 | Hartman et al. | |
| 6,606,480 B1 | 8/2003 | L'Allier et al. | |
| 6,618,746 B2 | 9/2003 | Desai et al. | |
| 6,662,194 B1 | 12/2003 | Joao | |
| 6,690,918 B2 | 2/2004 | Evans et al. | |
| 6,735,570 B1 | 5/2004 | Lacy et al. | |
| 6,757,674 B2 | 6/2004 | Wiens et al. | |
| 6,785,469 B1 | 8/2004 | Ide et al. | |
| 6,904,407 B2 | 6/2005 | Ritzel | |
| 7,092,952 B1 | 8/2006 | Wilens | |
| 7,099,872 B2 | 8/2006 | Carpenter et al. | |
| 7,191,139 B2 | 3/2007 | Roy et al. | |
| 7,212,985 B2 | 5/2007 | Sciuk | |
| 7,505,919 B2 | 3/2009 | Richardson | |
| 2010/0057535 A1* | 3/2010 | Sheperd | 705/10 |
| 2012/0109837 A1* | 5/2012 | Sahagun et al. | 705/321 |

OTHER PUBLICATIONS

StaffCV Core Features—Downloaded from web.archive.org on Aug. 1, 2010.
Notice of Allowance dated May 3, 2012 received in copending U.S. Appl. No. 11/104,142.
Notice of Allowance dated Aug. 3, 2010 received in copending U.S. Appl. No. 11/104,142.
Non-Final Office Action dated Apr. 14, 2009 received in copending U.S. Appl. No. 11/104,142.
Advisory Action dated Dec. 4, 2008 received in copending U.S. Appl. No. 11/331,672.
Final Office Action dated Mar. 7, 2008 received in copending U.S. Appl. No. 11/331,672.
Final Office Action dated Aug. 20, 2008 received in copending U.S. Appl. No. 11/331,672.
Final Office Action dated Sep. 17, 2009 received in copending U.S. Appl. No. 11/331,672.
Notice of Allowance dated Sep. 15, 2010 received in copending U.S. Appl. No. 11/331,672.
Non-Final Office Action dated Mar. 9, 2009 received in copending U.S. Appl. No. 11/331,672.
Non-Final Office Action dated Mar. 29, 2010 received in copending U.S. Appl. No. 11/331,672.
Non-Final Office Action dated Apr. 20, 2007 received in copending U.S. Appl. No. 11/331,672.
Advisory Action dated Feb. 21, 2013 received in copending U.S. Appl. No. 11/331,672.
Advisory Action dated May 13, 2010 received in copending U.S. Appl. No. 11/689,329.
Final Office Action dated Oct. 27, 2009 received in copending U.S. Appl. No. 11/689,329.
Final Office Action dated Nov. 21, 2012 received in copending U.S. Appl. No. 11/689,329.
Non-Final Office Action dated May 8, 2009 received in copending U.S. Appl. No. 11/689,329.
Non-Final Office Action dated Oct. 11, 2011 received in copending U.S. Appl. No. 11/689,329.
Notice of Allowance dated Sep. 10, 2010 received in copending U.S. Appl. No. 11/835,758.
Non-Final Office Action dated Oct. 5, 2009 received in copending U.S. Appl. No. 11/835,758.
Final Office Action dated Mar. 27, 2012 received in copending U.S. Appl. No. 12/478,299.
Non-Final Office Action dated Oct. 12, 2011 received in copending U.S. Appl. No. 12/478,299.
Non-Final Office Action dated Mar. 8, 2012 received in copending U.S. Appl. No. 12/415,567.
Non-Final Office Action dated Oct. 3, 2012 received in copending U.S. Appl. No. 12/415,567.
Non-Final Office Action dated Dec. 22, 2010 received in copending U.S. Appl. No. 12/415,567.

* cited by examiner

FIG. 7

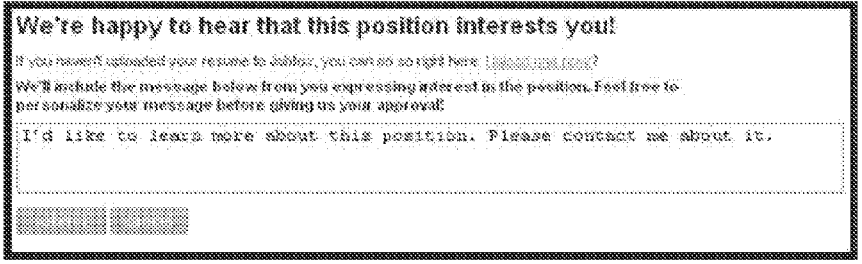
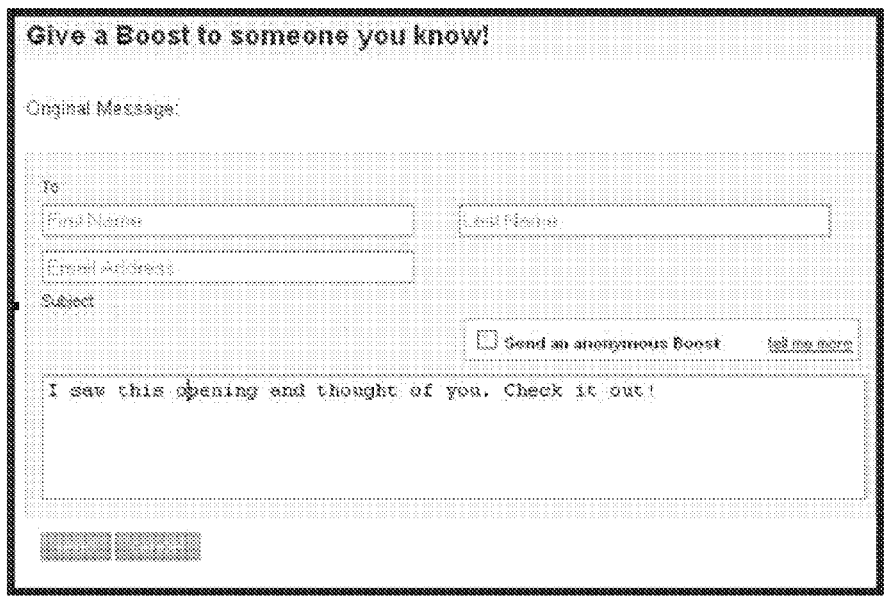
FIG. 14

A Boost from Marc stern (re: )

Jobfox Matching to me jobfox

Hello Francis,
I saw this opening and thought of you. Check it out!
Marc

Security Guard

Corporate Safety/Security in New York

Hi, I am interested in finding someone for a security guard position

Networking at Jobfox

With Jobfox, you'll gain access to an exclusive group of employers and recruiters in your field of interest from your area or all over the world.

- Hear about open positions from employers and recruiters in advance
- Create alliances with employers that appeal to you
- Get rewards for referring friends and colleagues to a position

FIG. 15

SYSTEM AND METHOD FOR SOCIAL RECRUITING

CROSS-REFERENCE TO RELATED APPLICATION

This application claims priority on the basis of U.S. Provisional Patent Application No. 61/446,813, filed on Feb. 25, 2011. The entire disclosure of the provisional patent application is incorporated herein by this reference.

BACKGROUND

Using standard job boards may be a slow and tedious way for a recruiter to fill job openings. The recruiter may need to sort through many unqualified resumes in order to find good candidates. The recruiter may also have little control over who can see a job posting for a job opening. This may limit the recruiter's ability to target job postings to an appropriate audience, and result in the recruiter receiving a greater volume of unqualified resumes for the open position. The volume of unqualified resumes may also increase with the number of job openings the recruiter is trying to fill. A recruiter trying to fill multiple job openings may find it daunting to process the number of resumes they receive.

A recruiter may use extant social networking sites to attempt to fill job openings. However, this may only be useful for very selective hiring. Social networking sites were not intended for use by recruiters, and even basic information on candidates, such as contact details, may not be readily available to a recruiter. The recruiter may expend too much time and effort when attempting to recruit using social networking sites.

BRIEF SUMMARY

It is an object of the present invention to provide a system and method for social recruiting.

In accordance with an aspect of the present invention, a system for social recruiting includes an employment system server including a user database, where the user database includes a recruiter profile and a job seeker profile, and a recruiter network for the recruiter profile includes the recruiter profile associated with the job seeker profile.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

FIG. 7 depicts an exemplary screenshot of a screen for establishing a recruiter network;

FIG. 14 depicts an exemplary screenshot of a screen for responding to a referral request;

FIG. 15 depicts an exemplary screenshot of a screen for indicating receipt of a referral request as a result of a boost;

DETAILED DESCRIPTION

Figure 1:
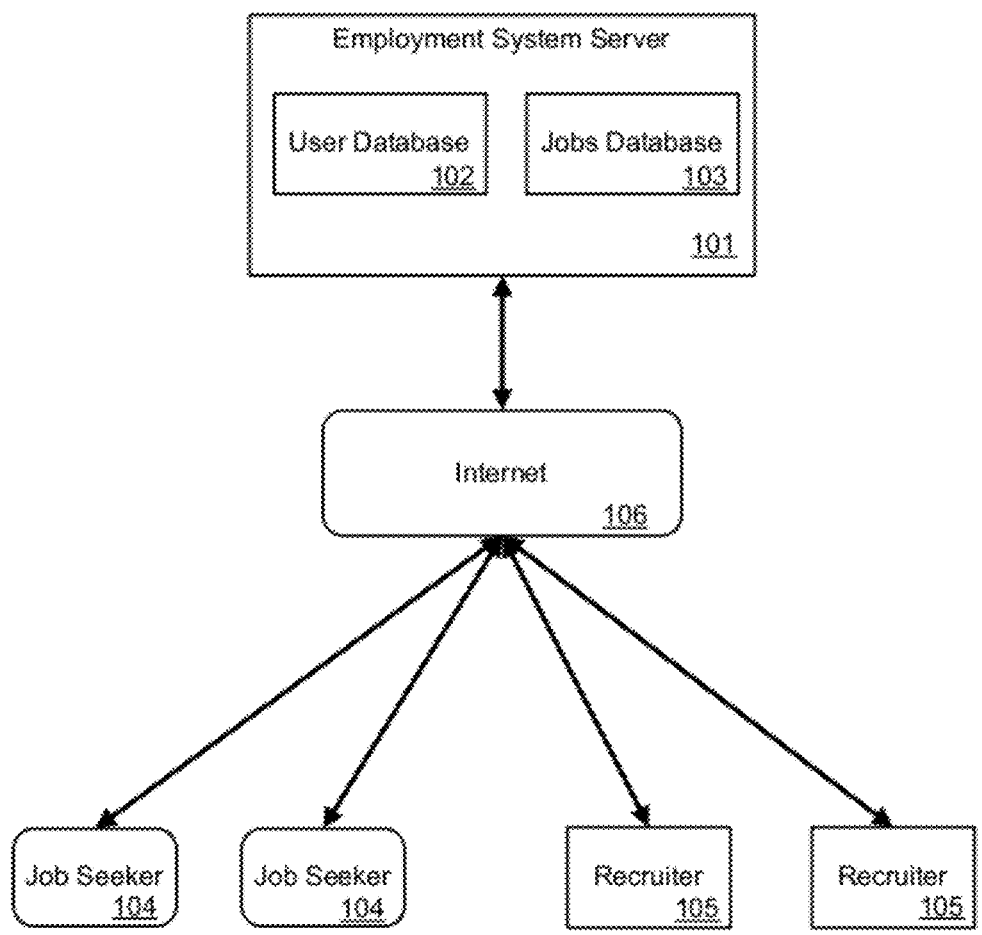
FIG. 1 depicts an exemplary employment system for social recruiting.

FIG. 1 depicts an exemplary employment system for social recruiting. The employment system may include an employment system server 101, and may be accessible by job seekers 104 and recruiters 105 using a network such as, for example, the Internet 106.

The employment system server 101 may be any suitable combination of hardware and software for implementing an employment system, and may include a user database 102 and a jobs database 103. The employment system implemented on the employment system server 101 may allow the recruiters 105 to post job openings, and the job seekers 104 to view and apply for the job openings. The job seekers 104 may be any individuals who wish to use the employment system server 101 to find a job. The recruiters 105 may be any individuals authorized to act on behalf of an employer to use the employment system server 101 to fill job openings for the employer. For example, the recruiter 105 may be a member of a Human Resources Department at a company. The job seekers 104 and the recruiters 105 may access the employment system server 101 through the Internet 106, using any suitable computing device, such as, for example, a personal computer or smartphone.

The employment system server 101 may include various features to assist the recruiters 105 in posting and filling job openings, and the job seekers 104 in finding and getting hired to fill job openings. For example, the employment system server 101 may provide assistance to the job seekers 104 in writing resumes, and may store the resumes on the employment system server 101. The employment system server 101 may also, for example, use any suitable manner, including automated algorithms, of matching the job seekers 104 to job openings. The employment system server may facilitate interaction between the job seekers 104 and the recruiters 105 in various ways, including, for example, allowing the job seekers 104 and the recruiters 105 to send messages to one another within the employment system.

The user database 102 may be any suitable combination of hardware and software for storing data pertaining to the users of the employment system. For example, data about the job seekers 104 and the recruiters 105 who access the employment system server 101 may be stored in the user database 102. The data may be stored in the form of profiles, such as, for example, job seeker profiles 203 for the job seekers 104 and recruiter profiles 202 for the recruiters 105. The job seeker profile 203 for the job seeker 104 may include, for example, contact information and resume and reference data for the job seeker 104. The recruiter profile 202 for the recruiter 105 may include, for example, contact information and company information for the recruiter 105. The job seeker profile 203 and the recruiter profile 202 may also contain any other relevant information concerning the interaction of the job seeker 104 and the recruiter 105 with the employment system server 101. When accessing the employment system server 101, the job seeker 104 may log-in to the job seeker profile 203, and the recruiter 105 may log-in to the recruiter profile 202. The data from the job seeker profile 203 and the recruiter profile 202 may be displayed to the job seeker 104 and the recruiter 105 when accessing the employment system server 101, and the job seeker 104 and the recruiter 105 may interact with the employment system server 101 through the job seeker profile 203 and the recruiter profile 202.

The jobs database 103 may be any suitable combination of hardware and software for storing data pertaining to job openings posted to the employment system by the recruiters 105. The recruiters 105 may post job openings to the employment system server 101. The job openings may include information about the open job the recruiter 105 is looking to fill, including, for example, the type of job, the location of the job, the type of job seeker 104 the recruiter 105 is looking for to fill the job, contact information for the recruiter 105 who posted the job, information about the company the recruiter 105 is posting the job on behalf of, and so on. This information may be stored in the jobs database 103. When a job seeker 104 uses the employment system server 101 to look for a job, they may search through the jobs database to retrieve current job openings. The employment system server 101 may also attempt to match job seekers 104 from the user database 102 with job openings from the jobs database 103.

Figure 2:
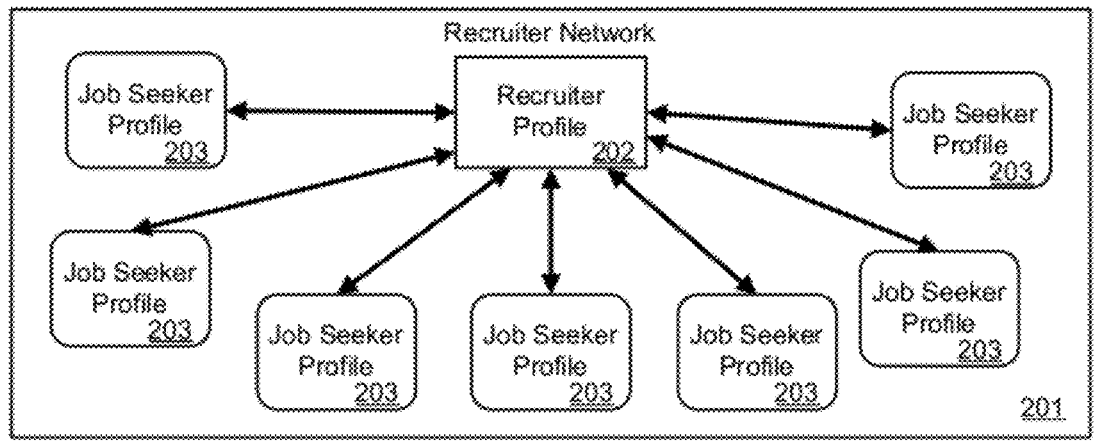
FIG. 2 depicts an exemplary recruiter network for social recruiting.

The employment system server 101 may support two types of networks, recruiter networks and house networks. FIG. 2 depicts an exemplary recruiter network for social recruiting. A recruiter 105 using the employment system server 101 may establish a recruiter network 201. The recruiter network 201 may be a network linked to the recruiter profile 202 for the recruiter 105, and may associate the recruiter profile 202 with the various job seeker profiles 203 for the job seekers 104.

The recruiter network 201 may be constructed through the job seekers 104 requesting to join the recruiter network 201. When the job seeker profile 203 for the job seeker 104 is associated with the recruiter profile 202 for the recruiter 105, the job seeker 104 may be considered to be in, or a member of, the recruiter network 201 for the recruiter 105. The job seeker profiles 203 in the recruiter network 201 may not be associated with each other, so that the job seeker 104 whose job seeker profile 203 is in the recruiter network 201 cannot see the other job seeker profiles 203 in the recruiter network 201. The job seeker 104 may only be able see which of the recruiter networks 201 that job seeker 104 is in, and may not be able to tell which recruiter networks 201 any other job seekers 104 are in.

Communication within the recruiter network 201 may be between the recruiter 105 and the job seekers 104. The recruiter 105 may use the recruiter profile 202 to send messages to any number of the job seekers 104 through their job seeker profiles 203. The job seekers 104 may also send messages to the recruiter 105. Because the job seekers 104 cannot see other job seeker profiles 203 in the recruiter network 201, the job seekers 104 may not be able to communicate with one another through the recruiter network 201. The communications from the recruiter 105 may be, for example, in regard to job openings the recruiter 105 wishes to fill, or for pending network requests already submitted.

The recruiter 105 may use the employment system server 101 to indicate which types of job seekers 104 will be allowed to request to join the recruiter network 201, setting up a definition for the recruiter network 201. For example, the recruiter 105 may set up criteria based on profession, location, years of experience, desired salary levels, and so on. The criteria may also be a cross-product of individual criteria. For example, the recruiter 105 may indicate they want sales people in Atlanta and Boston, but software developers in San Diego and San Francisco. The definition of the recruiter network 201 may be altered at any time. Alterations may affect which of the job seekers 104 are allowed to request to join the recruiter network 201, and may not affect the job seekers 104 who are already in the recruiter network 201.

Decisions on which of the jobs seekers 104 who request to join the recruiter network 201 will be allowed to join the recruiter network 201 may be made by the recruiter 105 or other authorized user of the recruiter profile 202, or through auto-acceptance rules. Auto-acceptance rules may specify certain criteria that, if met by a job seeker 104 who asks to join the recruiter network 201, will result in the job seeker 104 being added to the recruiter network 201 automatically. The employment system server 101 may compare the job seeker profile 203 for the job seeker 104 to the auto-acceptance rules to determine if the job seeker 104 will be automatically added to the recruiter network 201.

The recruiter 105 may be able to manage the recruiter network 201 in any suitable manner. For example, the recruiter 105 may be able to remove job seekers 104 from the recruiter network 201, disassociating job seeker profiles 203 from the recruiter profile 202. The recruiter 105 may be able to send out invitations to job seekers 104 to join the recruiter network 201.

The recruiter network 201 may be deleted, transferred to another recruiter 105, or assigned a new recruiter 105 if the recruiter 105 for the recruiter network 201 becomes no longer responsible for the recruiter network 201. For example, the recruiter 105 may take a job with a new employer. The recruiter 105 may be replaced by a new recruiter 105, who may set up a new recruiter profile 202. The recruiter profile 202 for the departing recruiter 105 may be replaced with the new recruiter profile 202 for the new recruiter, resulting in the job seeker profiles 203 being associated with the new recruiter profile 202. The recruiter network 201 may also be transferred to a different recruiter 105 who already has a recruiter profile 202. The job seeker profiles 203 may be disassociated from the recruiter profile 202 for the departing recruiter 105, and associated with the recruiter profile 202 for the different recruiter 105, becoming part of the recruiter network 201 for the different recruiter 105. The recruiter 105 may also delete the recruiter network 201, disassociating the job seeker profiles 203 from the recruiter profile 202, and not re-associating the job seeker profiles 203 with any other recruiter profile 202.

Figure 3:
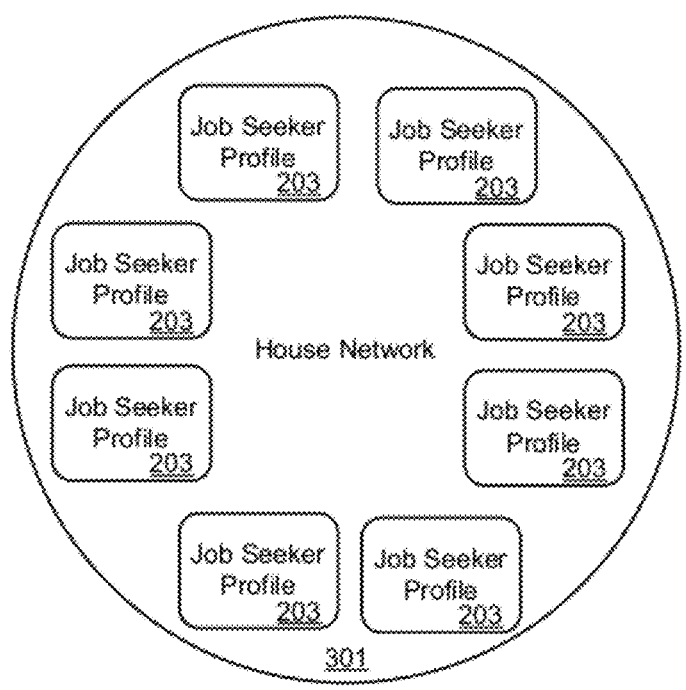
FIG. 3 depicts an exemplary house network for social recruiting.

FIG. 3 depicts an exemplary house network for social recruiting. A house network 301 may be a network that does not involve a recruiter 105, and includes no recruiter profiles 202. Instead of associating the job seeker profiles 203 with the recruiter profile 202, in the house network 301 the job seeker profiles 203 may be associated with the house network 301 itself. The job seeker profiles 203 in the house network 301 may not be associated with one another. The house network 301 may be set up with criteria that determines who can join the house network 301. These criteria may be set up by, for example, the operators of the employment system server 101. A job seeker 104 may join any house network 301 for which they are qualified based on their job seeker profile 203. Acceptance to the house network 301 may be automatic for any requesting job seeker 104 whose job seeker profile 203 meets the criteria for the house network 301.

For example, the house network 301 may be set up for IT professionals in Atlanta. If the job seeker 104 with the job seeker profile 203 that indicates the job seeker 104 is an IT professional in Atlanta requests to join the house network 301, the job seeker 104 may be automatically joined to the house network 301. The job seeker profile 203 for the job seeker 104 may be associated with the house network 301. If the job seeker 104 with the job seeker profile 203 that indicates the job seeker 104 is an IT professional in San Francisco, the job seeker 104 may not be able to see the house network 301, and therefore may not be able to request to join the house network 301, as the job seeker profile 203 does not match the criteria for the house network 301.

The house networks 301 may be communicated with by the recruiters 105. For example, the recruiter 105 may need to fill a job opening that is not well-matched by the job seeker profiles 203 in the recruiter network 201 for the recruiter 105. For example, the recruiter network 201 for the recruiter 105 may include job seekers 104 who are IT professionals in San Francisco, but the recruiter 105 wishes to fill a job opening for an accounting professional in Atlanta. The recruiter 105 may find the house network 301 with job seeker profiles 203 that are better matches, for example, a house network 301 for accounting professionals in Atlanta, and communicate with the job seekers 104 who are members of the house network 301 in attempting to fill the job opening.

Figure 4:
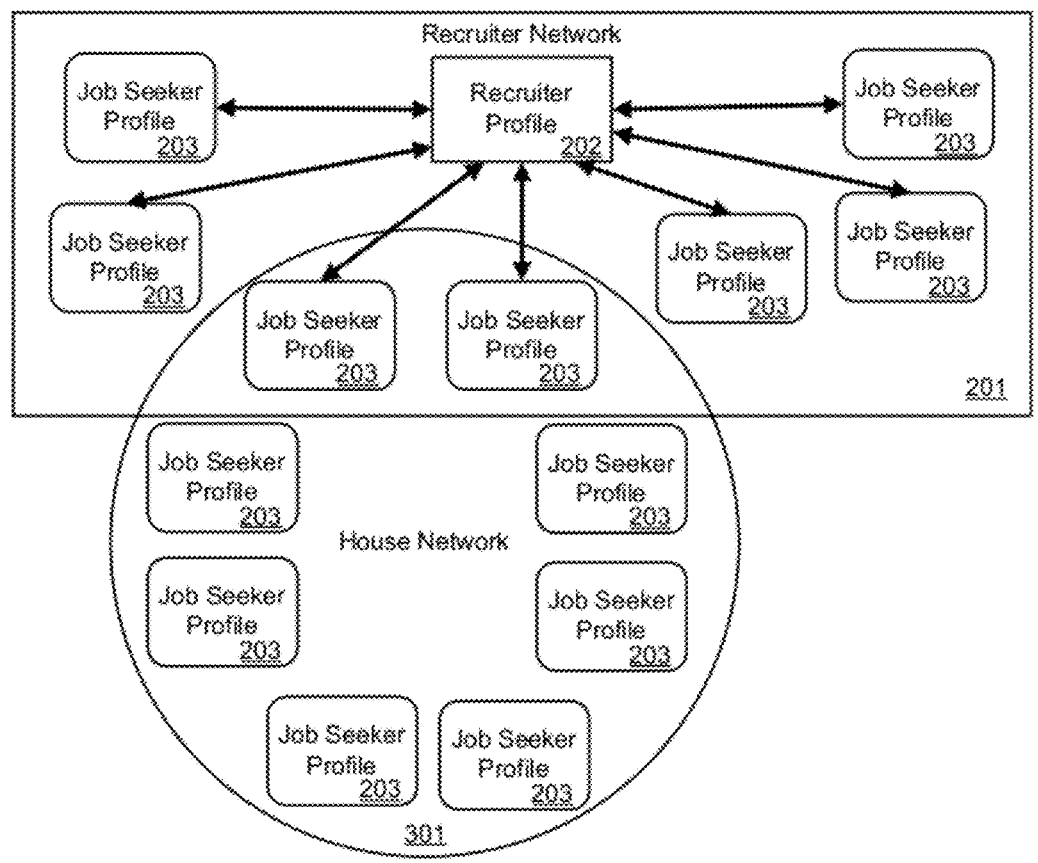
FIG. 4 depicts an exemplary recruiter network and exemplary house network with overlapping members.

FIG. 4 depicts an exemplary recruiter network and exemplary house network with overlapping members. The job seeker 104 may join multiple networks, including both recruiter networks 201 and house networks 301. This may result in one job seeker profile 203 being associated with multiple recruiter profiles 202 in multiple recruiter networks 201, as well as with multiple house networks 301. The job seeker profile 203 that is associated with more than one network may not connect the networks. For example, the job seeker profile 203 that is associated with the recruiter profile 202 in the recruiter network 201 and the house network 301 may not join the recruiter network 201 and the house network 301. Communication from the recruiter 105 sent through the recruiter profile 202 to the job seekers 104 with the job seeker profiles 203 in the recruiter network 201 may not also go to the job seekers 104 with the job seeker profiles 203 in the house network 301, except for those job seeker profiles 203 that are associated with both the recruiter network 201 and the house network 301. The recruiter network 201 and the house networks 301 may be kept separate despite having overlapping members.

Figure 5:
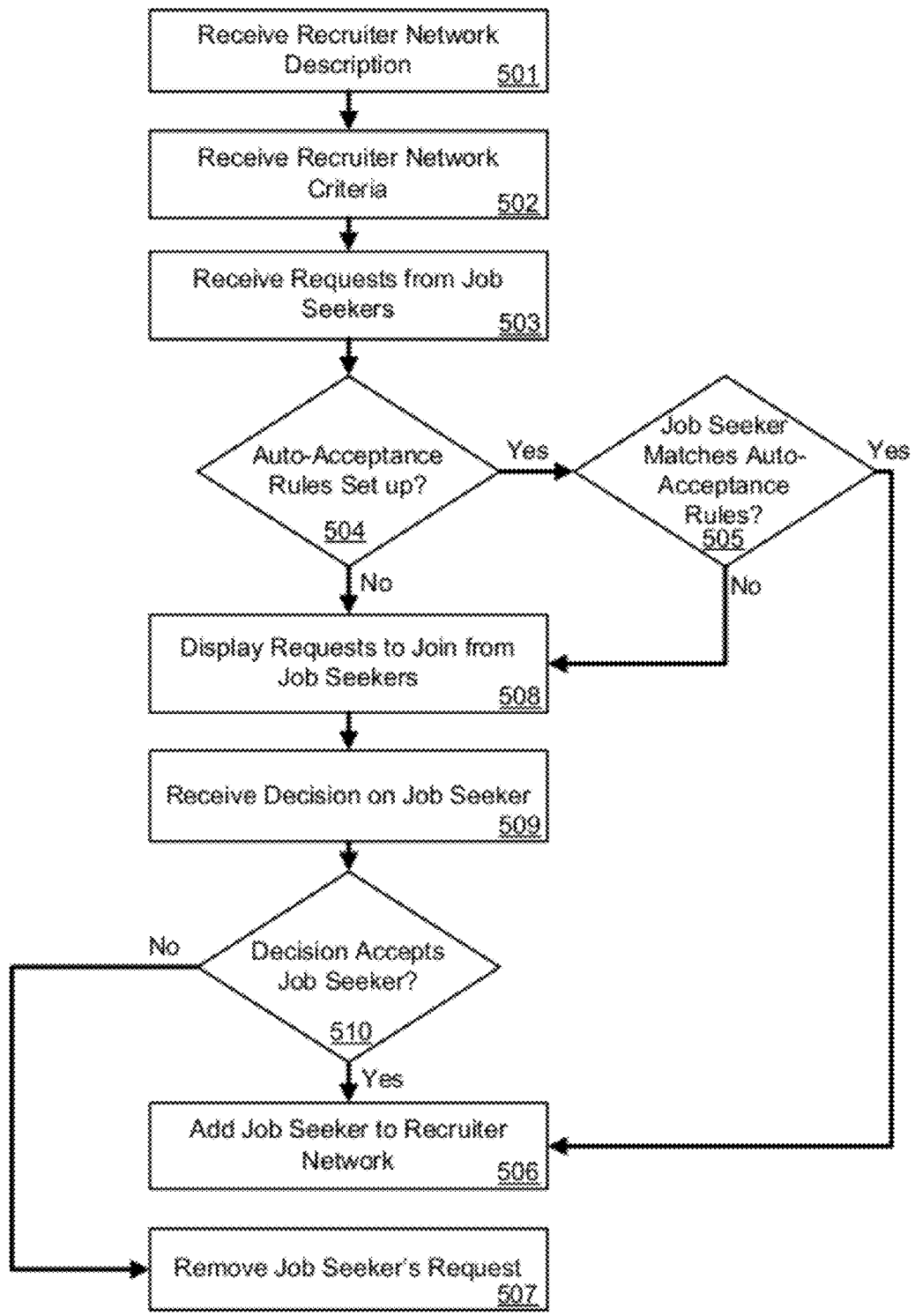
FIG. 5 depicts an exemplary procedure for establishing and managing a recruiter network.
Figure 7:
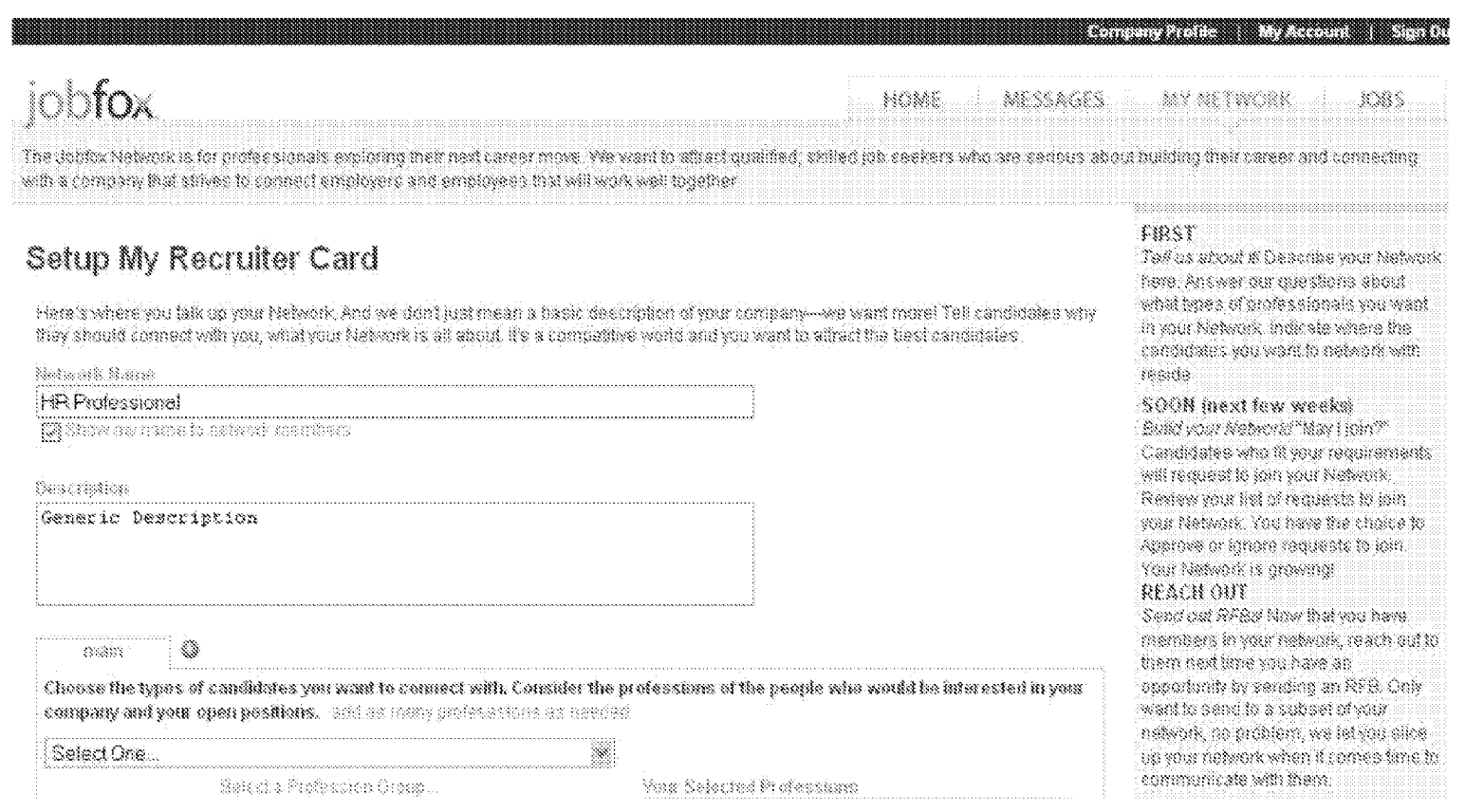

FIG. 5 depicts an exemplary procedure for establishing and managing a recruiter network. In block 501, the employment system server 101 may receive a description for the recruiter network 201. For example, the recruiter 105 may log-in to the employment system server 101 through the recruiter profile 202, and choose to set up the recruiter network 201. The recruiter profile 202 for the recruiter 105 may be associated with the new recruiter network 105. The recruiter 105 may enter a description for the recruiter network 201, including, for example, a title for the network, a description of the employer the recruiter 105 works for, descriptions of the types of jobs openings that will be filled through the recruiter network 201, and descriptions of the types of job seekers 104 who will be allowed to join the recruiter network 201. The employment system server 101 may store the network description received from the recruiter 105 for the recruiter network. FIG. 7 depicts an exemplary screenshot of a screen for establishing a recruiter network. The employment system sever 101 may display a screen such as, for example, the screen depicted in FIG. 7, to the recruiter 105 when the recruiter 105 is setting up the recruiter network 201. The recruiter 105 may use the screen to enter the description of the recruiter network 201.

Figure 8:
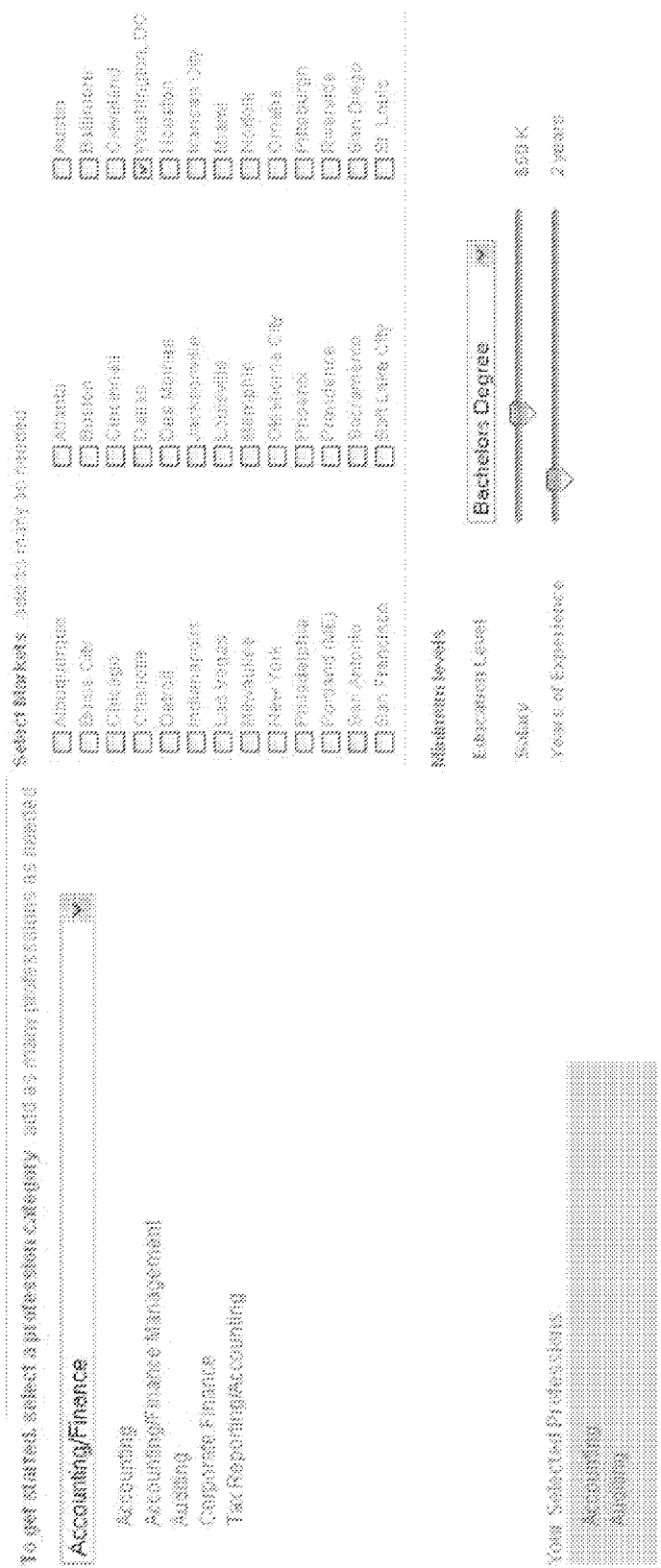
FIG. 8 depicts an exemplary screenshot of a screen for establishing criteria for a recruiter network.

In block 502, the employment system server 101 may receive criteria for the recruiter network 201. The recruiter 105 may set up the various criteria that will be used to determine which of the job seekers 104 will be allowed to request join the recruiter network 201. The recruiter 105 may, for example, be presented with various preset criteria to choose from in establishing the criteria for the recruiter network 201, such as, for example, a list of locations, a list of professions, a range of salary requirements, a range of years of experience, a list of educational and professional qualifications, and so on. Any other suitable manner of receiving criteria input from the recruiter 105 may be used, including, for example, receiving text input. The employment system server 101 may store the criteria received from the recruiter 105 for the recruiter network. FIG. 8 depicts an exemplary screenshot of a screen for establishing criteria for a recruiter network. The employment system sever 101 may display a screen such as, for example, the screen depicted in FIG. 8, to the recruiter 105 when the recruiter 105 is setting up criteria for the recruiter network 201. The recruiter 105 may use the screen to enter the criteria for the recruiter network 201, for example, using drop down boxes, check boxes, sliders, or any other suitable input controls.

The recruiter 105 may also set up auto-acceptance rules based on the criteria. The auto-acceptance rules may allow for a request to join the recruiter network 201 from the job seeker 104 to be automatically approved if the job seeker profile 203 for the job seeker 104 matches certain criteria for the recruiter network 201. For example, the recruiter network 201 may have the criteria that only job seekers 104 located in New York City or Boston may join the recruiter network. An auto-acceptance rule may be set up to automatically accept any request to join the network from a job seeker 104 with a job seeker profile 203 that indicates the job seeker 104 is located in New York City.

In block 503, the employment system server 101 may receive requests from the job seekers 104 to join the recruiter network 201. As discussed in FIG. 6, the job seekers 104 may see they are eligible to request to join the recruiter network 201 through their job seeker profile 203. The job seekers 104 may request to join the recruiter network 201, and the request may be received by the employment system server 101.

In block 504, the employment system server 101 may determine if auto-acceptance rules have been set up for the recruiter network 201. If auto-acceptance rules have been set up for the recruiter network 201, flow proceeds to block 505. Otherwise, flow proceeds to block 508.

In block 505, the employment system server 101 may determine if the job seeker 104 matches any of the auto-acceptance rules for the recruiter network 201. The job seeker profile 203 for the requesting job seeker 104 may be matched against the auto-acceptance rules for the recruiter network 201. For example, the job seeker 104 whose job seeker profile 203 indicates the job seeker 104 is an IT professional in New York City may request to join the recruiter network 201. If the recruiter network 201 has an auto-acceptance rule for IT professionals from New York, Boston, or Philadelphia, the job seeker profile 203 may match the auto-acceptance rule. If the recruiter network 201 has no auto-acceptance rule for IT professionals or job seekers 104 from New York, the job seeker profile 203 may not match any auto-acceptance rules. If the job seeker profile 203 matches an auto-acceptance rule for the recruiter network 201, flow proceeds to block 506. Otherwise, flow proceeds to block 508.

Figure 9:
FIG. 9 depicts an exemplary screenshot of screen for displaying a request to join a recruiter network.

In block 508, the employment system server 101 may display a request to join the recruiter network 201 to the recruiter 105. The recruiter 105 may access the employment system server 101 through the recruiter profile 202. Any requests to join the recruiter network 201 received by the employment system server 101 from the job seekers 104 may be displayed to the recruiter 105. FIG. 9 depicts an exemplary screenshot of screen for displaying a request to join a recruiter network. The employment system server 101 may display a request to join the recruiter network 201 to the recruiter 105 using, for example, a screen as depicted in FIG. 9. The job seeker profile 203 of the requesting job seeker 104 may be displayed, along with input controls, such as, for example, buttons, which the recruiter 105 may use to accept or ignore the request. If there are requests from multiple job seekers 104, the requests may be displayed, for example, in a list format.

In block 509, the employment system server 101 may receive a decision from the recruiter 105 on the request from the job seeker 104. The recruiter 105 may input to the employment system server 101 a decision on the request from the job seeker 104 to join the recruiter network 201 using, for example, accept and ignore buttons as depicted in FIG. 9. Any other suitable type of input control may also be used.

In block 510, the employment system server 101 may determine if the decision from the recruiter 105 accepted the job seeker 104. If the decision from the recruiter 105 accepts the job seeker 104, for example, the recruiter used the accept button as depicted in FIG. 9 to input a decision on the request from the job seeker 104, flow proceeds to block 506. Otherwise, flow proceeds to block 507.

In block 506, the job seeker 104 may be added to the recruiter network 201. If the job seeker profile 203 matched an auto-acceptance rule for the recruiter network 201, as determined in block 505, or if the recruiter 105 decided to accept the job seeker 104 to the recruiter network 201, as determined in block 510, the job seeker 104 may be added to the recruiter network 201. The job seeker profile 203 for the job seeker 104 may be associated with the recruiter profile 202 for the recruiter 105, making the job seeker 104 a member of the recruiter network 201. The employment system server 101 may notify the job seeker 104, through the job seeker profile 203, that the job seeker 104 has been allowed to join the recruiter network 201.

In block 507, the employment system server 101 may remove the request from the job seeker 104. If the job seeker profile 203 did not match an auto-acceptance rule, and the recruiter 105 decided to not accept the job seeker 104, the job seeker 104 may not be joined to the recruiter network 201. The job seeker profile 203 may not be associated with the recruiter profile 202, and the request from the job seeker 104 may no longer be displayed to the recruiter 105. No notification may be sent to the job seeker 104, and there may be no indication in the job seeker profile 203 that the job seeker 104 was not allowed to join the recruiter network 201.

Figure 6:
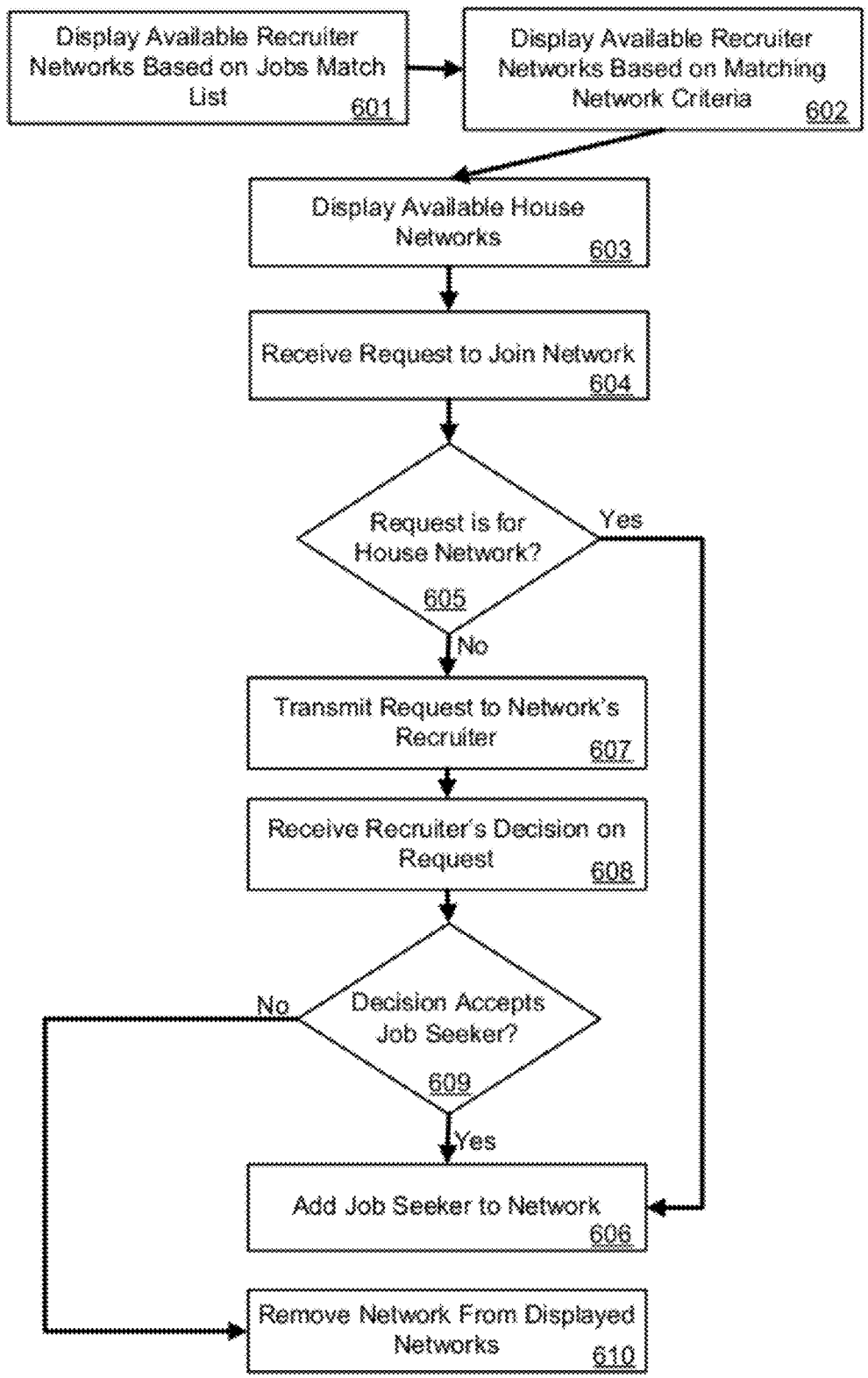
FIG. 6 depicts an exemplary procedure for joining a job seeker to a network.

FIG. 6 depicts an exemplary procedure for joining a job seeker to a network. In block 601, the employment system server 101 may display available recruiter networks 201 to the job seeker 104 based on a jobs match list. The job seeker 104 may be eligible to join a recruiter network 201 for a recruiter 105 if the job seeker profile 203 for the job seeker 104 has been matched to job openings posted by the recruiter 105. The job openings may be stored in the jobs database 103. A jobs match list may be a list of the job openings to which the job seeker 104 has been matched. The employment system server 101 may use any suitable technique or algorithm for matching the job seeker 104 to job openings in the jobs database 103 based on the job seeker profile 203 for the job seeker 104. If the employment system server 101 determines that a job seeker 104 is a match for a job opening that was posted by the recruiter 105, the job seeker 104 may be notified of the match and that the job seeker 104 is eligible to join the recruiter network 201 for the recruiter 105. The recruiter 105 may be able to disable the ability to request to join the recruiter network 201 based on matching a job opening for specific job openings.

For example, when the job seeker 104 logs in to the employment system server 101 through the job seeker profile 203, the employment system server 101 may display the job match list, including job openings from the jobs database 103 that the job seeker 104 has been matched to by the employment system server 101. The employment system server 101 may display to the job seeker 104 the recruiter networks 201 that the job seeker 104 is now eligible to join based on the job openings in the job match list.

In block 602, the employment system server 101 may display available recruiter networks 201 to the job seeker 104 based on the job seeker profile 203 matching criteria set by the recruiter 105 for the recruiter network 201. The employment system server 101 may determine if the job seeker profile 203 for the job seeker 104 matches the criteria set for any recruiter networks 201. If the job seeker profile 203 matches the criteria for a recruiter network 201, the job seeker 104 may be eligible request to join the recruiter network 201. The recruiter networks 201 the job seeker 104 may be eligible to join based on matching criteria may displayed to the job seeker 104, for example, as a list.

When the recruiter network 201 is displayed to an eligible job seeker 104, as in blocks 601 and 602, the identity of the recruiter 105 may be hidden from the job seeker 104, for example, through the use of pseudonyms. This may prevent the job seeker 104 from being able to contact the recruiter 105 directly without first requesting to join and being accepted to the recruiter network 201 for the recruiter 105.

In block 603, the employment system server 101 may display available house networks 301 to the job seeker 104. The job seeker 104 may be eligible to join a house network 301 if the job seeker profile 203 for the job seeker 104 matches the criteria for the house network 301. The house networks 301 which the job seeker 104 is eligible to join may be displayed to the job seeker 104.

In block 604, the employment system server 101 may receive a request to join a network from the job seeker 104. The job seeker 104 may select from among the recruiter networks 201 and the house networks 301 the job seeker 104 is eligible to join, for example, as displayed in blocks 601, 601, and 603. The job seeker 104 may submit a request to join the selected recruiter network 201 or house network 301 to the employment system server 101, using any suitable input control, such as, for example, a request button.

In block 605, the employment system server 101 may determine if the request received from the job seeker 104 is a request to join a house network 301. If the job seeker 104 requested to join a house network 301, flow proceeds to block 606. Otherwise, the job seeker 104 has requested to join a recruiter network 201, and flow proceeds to block 607.

In block 607, the employment system server 101 may transmit the request from the job seeker to join the recruiter network 201 to the recruiter 105. As discussed above, the recruiter 105 may set-up the recruiter network 201, and may decide which job seekers 104 are allowed to join the recruiter network 201. When a job seeker 104 requests to join the recruiter network 201, that request may be transmitted to the recruiter 105 for the recruiter network 201, so that the recruiter 105, or auto-acceptance rules for the recruiter network 201, may decide on the request. For example, as discussed above, the job seeker profile 203 for the requesting job seeker 104 may be placed on a list the employment system server 101 may display to the recruiter 105.

In block 608, the employment system server 101 may receive a decision from the recruiter 105 on the request from the job seeker 104. As discussed above, the recruiter 105, or any auto-acceptance rules set up by the recruiter 105, may decide whether a job seeker 104 requesting to join the recruiter network 201 is allowed to join the recruiter network 201. If the recruiter network 201 has auto-acceptance rules, the decision may be automatic, as described above, without any additional input from the recruiter 105. If there are no auto-acceptance rules, or if the job seeker profile 203 for the job seeker 104 does not match any of the auto-acceptance rules, the recruiter 105 may decide whether the job seeker 104 is allowed to join the recruiter network 201, for example, using accept or ignore buttons as depicted in FIG. 9 to indicate the decision to the employment system server 101.

In block 609, the employment system server 101 may determine whether the decision accepts the job seeker 104. If the decision from the recruiter 105, or the auto-acceptance rules, accepts the job seeker 104, flow proceeds to block 606. Otherwise, if the decision does not accept the job seeker 104, flow proceeds to block 610.

In block 606, the employment system server 101 may add the job seeker 104 to the network the job seeker 104 requested to join. For example, if the job seeker 104 requested to join the house network 301, the job seeker 104 may be automatically joined to the house network 301. Because the job seeker 104 may only be able to request to join the house network 301 when the job seeker 104 already meets the criteria for the house network 301, based on the job seeker profile 203, the employment system server 101 may need to do no additional matching. If the job seeker 104 did not meet the criteria for the house network 301, the job seeker 104 would not be able to request to join the house network 301. When the job seeker 104 is joined to the house network 301, the job seeker profile 203 for the job seeker 104 may be associated with the house network 301. The house network 301 may appear to the job seeker 104 in a list of networks the job seeker 104 is a member of.

If the job seeker 104 requested to join the recruiter network 201, and the request was approved by the recruiter 105 or auto-acceptance rules for the recruiter network 201, the job seeker 104 may be joined to the recruiter network 201. The job seeker profile 203 for the job seeker 104 may be associated with the recruiter profile 202 for the recruiter 105. The recruiter network 201 may appear to the job seeker 104 in a list of networks the job seeker 104 is a member of.

The job seeker 104 may be able to leave any recruiter network 201 or house network 301 at any time. For example, the job seeker 104 may have the option to delete a network from a list of networks the job seeker 104 is a member of, disassociating the job seeker profile 203 from the house network 301 or the recruiter profile 202 of the recruiter network 201.

The recruiter 105 may communicate with the job seekers 104 in the recruiter network 201 in order to fill job openings. The recruiter 105 may send out a referral request, or request-for-boost (RFB), to the job seekers 104 in the recruiter network 201, seeking referrals from the job seekers 104 to fill a job opening. The job seekers 104 may respond to the RFB by expressing interest in the job opening, or they may pass the RFB on to another job seeker 104 who is not in the recruiter network 201, who the job seeker 104 may think is a good candidate to fill the job opening in the RFB. The job seeker 104 may be referring, or boosting, the another job seeker 104 for the job opening. This may allow the recruiter 105 to recruit job seekers 104 outside of the recruiter network 201, and to find new job seekers 104 to add to the recruiter network 201, expanding the recruiter network 201 without requiring the recruiter 105 to actively search for new job seekers 104. Instead the job seekers 104 already in the recruiter network 201 may do the searching for the recruiter 105 through boosting after receiving RFBs.

Figure 10A:
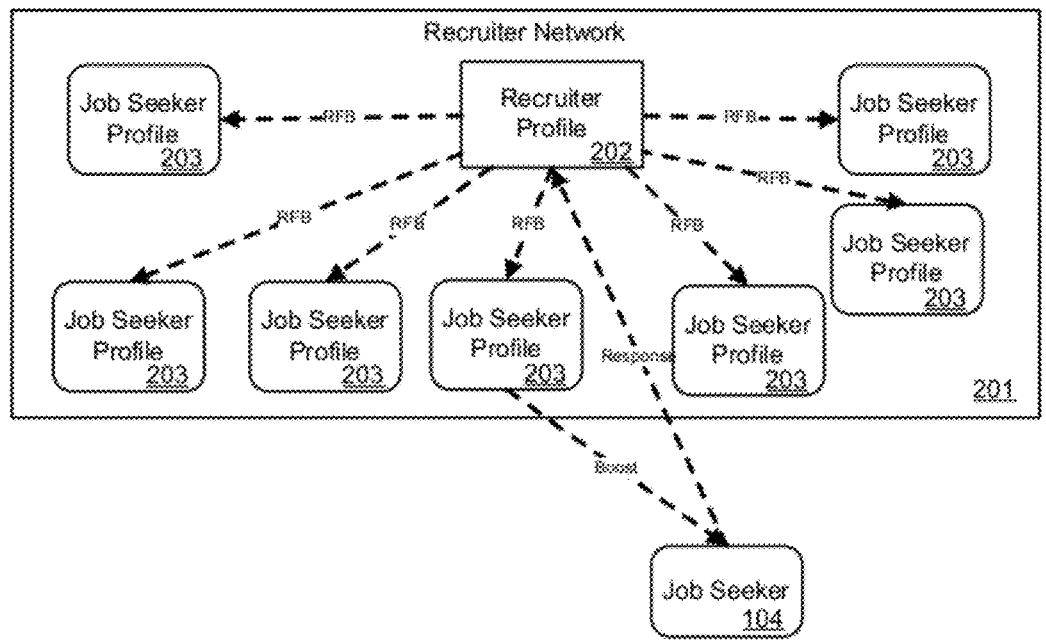
FIG. 10a depicts an exemplary referral request distributed through a recruiter network.

FIG. 10a depicts an exemplary referral request distributed through a recruiter network. An RFB may be sent from the recruiter profile 202 to the job seeker profiles 203 for the job seekers 104 in the recruiter network 201. One of the job seekers 104 may forward the RFB to a job seeker 104 who is not in the recruiter network 201 who may be qualified for the job opening. The job seeker 104 not in the recruiter network 201 may or may not already have a job seeker profile 203 in the user database 102 of the employment system server 101. If the job seeker 104 not in the recruiter network 201 does not have a job seeker profile 203, the RFB may be sent to, for example, an email address external to the employment system server 101. The retransmission of the RFB to the job seeker 104 not in the recruiter network 201 may be a boost. The job seeker 104 who sends the RFB may be recommending, or boosting, the job seeker 104 not in the recruiter network 201 to the recruiter 105 for the job opening described in the RFB.

Figure 10B:
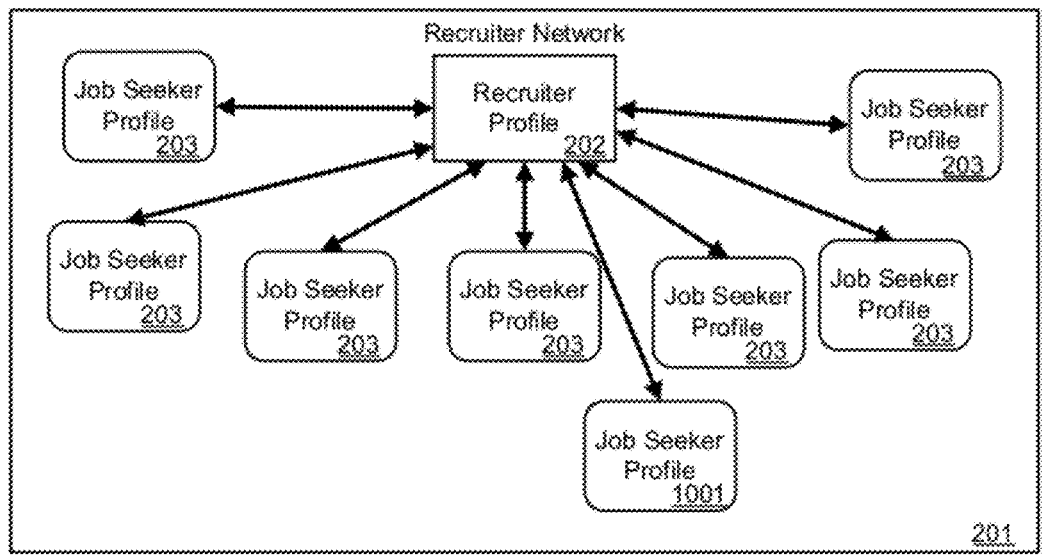
FIG. 10b depicts an exemplary recruiter network expanded after a referral request.

FIG. 10b depicts an exemplary recruiter network expanded after a referral request. Upon receiving the resending of the RFB, or boost, the job seeker 104 not in the recruiter network 201 may request to join the recruiter network 201. The request may be decided on as described previously, and if the job seeker 104 is allowed to join the recruiter network 201, the job seeker profile 1001 may be associated with the recruiter profile 202, joining the job seeker 104 to the recruiter network 201. The job seeker profile 1001 may already be in the user database 102 of the employment system server 101, or may be created by the job seeker 104 in conjunction with requesting to join the recruiter network 201.

Figure 11:
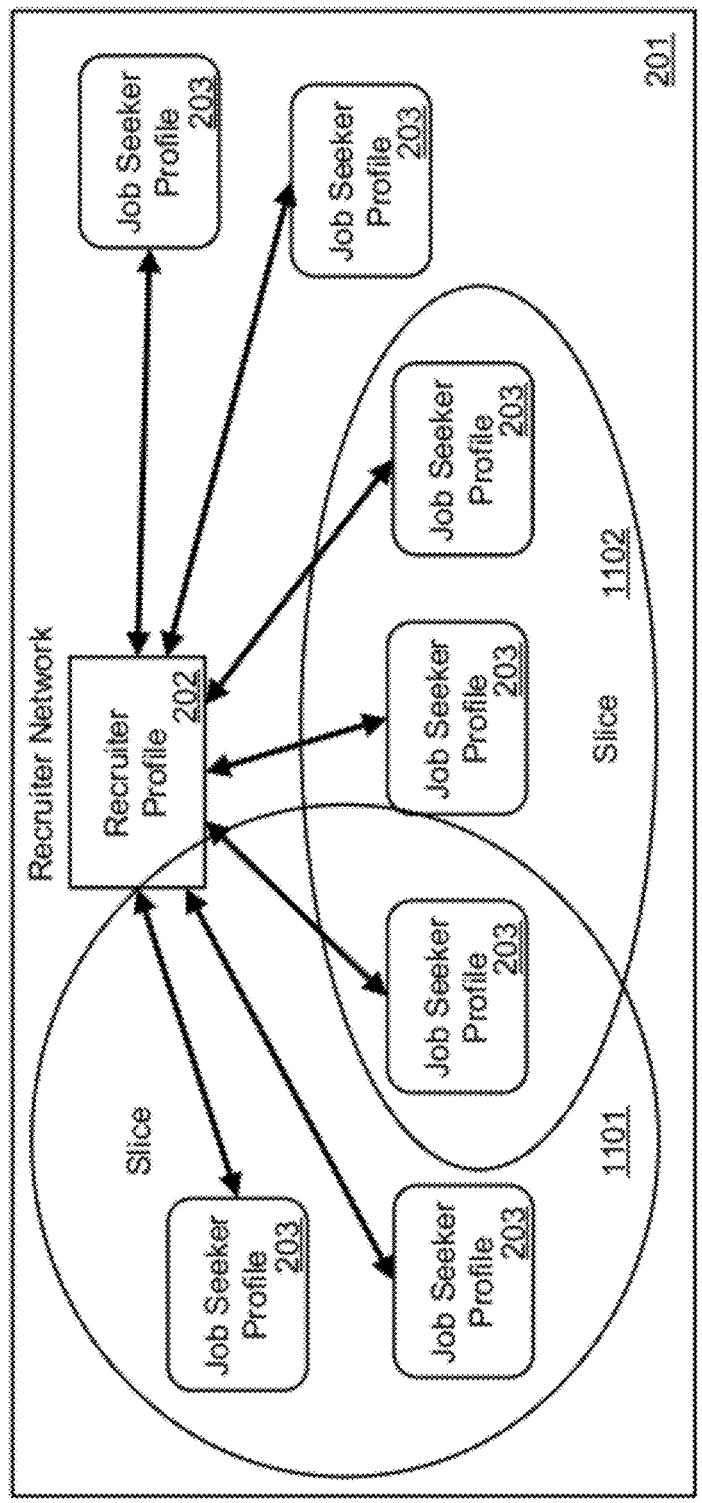
FIG. 11 depicts an exemplary recruiter network with network slices.

When sending out an RFB, the recruiter 105 may want limit which of the job seekers 104 in the recruiter network 201 actually receive the RFB. FIG. 11 depicts an exemplary recruiter network with network slices. The recruiter 105 may divide the job seekers 104 in the recruiter network 201 into slices, for example, slice 1101 and slice 1102. The recruiter 105 may specify which of the job seeker profiles 203 in the recruiter network 201 go into which slice, and job seeker profiles 203 in a slice may share common attributes. For example, the recruiter 105 may put all of the job seekers 104 who are located in Atlanta into the slice 1101, and all of the job seekers 104 who are IT professionals into the slice 1102. The slices 1101 and 1102 may overlap. The recruiter 105 may send out RFBs, or other communications, to the job seekers 104 only in particular slices of the recruiter network 201.

Figure 12:
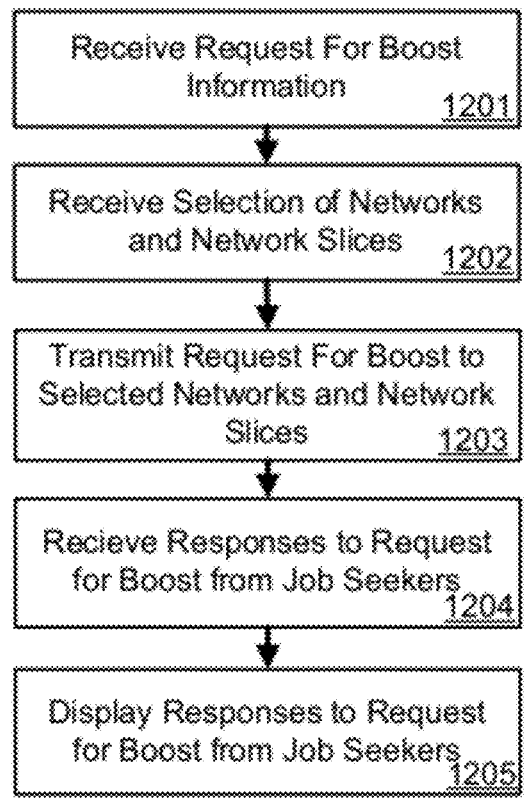
FIG. 12 depicts an exemplary procedure for a referral request.

FIG. 12 depicts an exemplary procedure for a referral request. In block 1201, the employment system server 101 may receive information for an RFB from the recruiter 105. For example, the recruiter 105 may input to the employment system server 101 information indicating the job opening the RFB is looking to fill, the qualifications the recruiter 105 is looking for in applicants for the job opening, and so on. The RFB may also include a spiff, which may be an amount of money to be paid to a job seeker 104 who refers, or boosts, another job seeker 104 who gets hired to fill the job opening in the RFB and accepts. For example, if an RFB with a spiff of $500 is sent to a first job seeker 104, and the first job seeker 104 boosts a second job seeker 104 for the job opening, and the second job seeker 104 is offered and accepts the job to fill the job opening, the first job seeker 104 may be paid the $500 spiff.

The job opening in the RFB may be a job opening already in the jobs database 103, or may be a blind solicitation. If the job opening is already in the jobs database 103, the recruiter 105 may generate the RFB by picking the job opening from a list of job openings in the jobs database 103 associated with the recruiter profile 202 or the employer of the recruiter 105. If the job opening is a blind solicitation, the recruiter 105 may enter all the relevant information to the employment system server 101 and the job opening may not be entered in the jobs database 103. The employer and the recruiter 105 may be kept anonymous in the RFB.

In block 1202 the employment system server 101 may receive a selection of networks and network slices. The recruiter 105 may choose to send the RFB to the recruiter network 201 or slices of the recruiter network 201 and various house networks 301. The recruiter 105 may indicate the selection to the employment system server 101 using any suitable input controls.

In block 1203, the employment system server 101 may transmit the RFB to the selected networks and network slices. The employment system server 101 may send the RFB to the job seekers 104 in the recruiter network 201 or selected slices and the selected house networks 301. If a job seeker 104 has a job seeker profile 203 associated with one of the selected house networks 301, or with the recruiter profile 202 in the recruiter network 201 or in a selected slice of the recruiter network 201, the job seeker 104 may receive the RFB.

Figure 13:
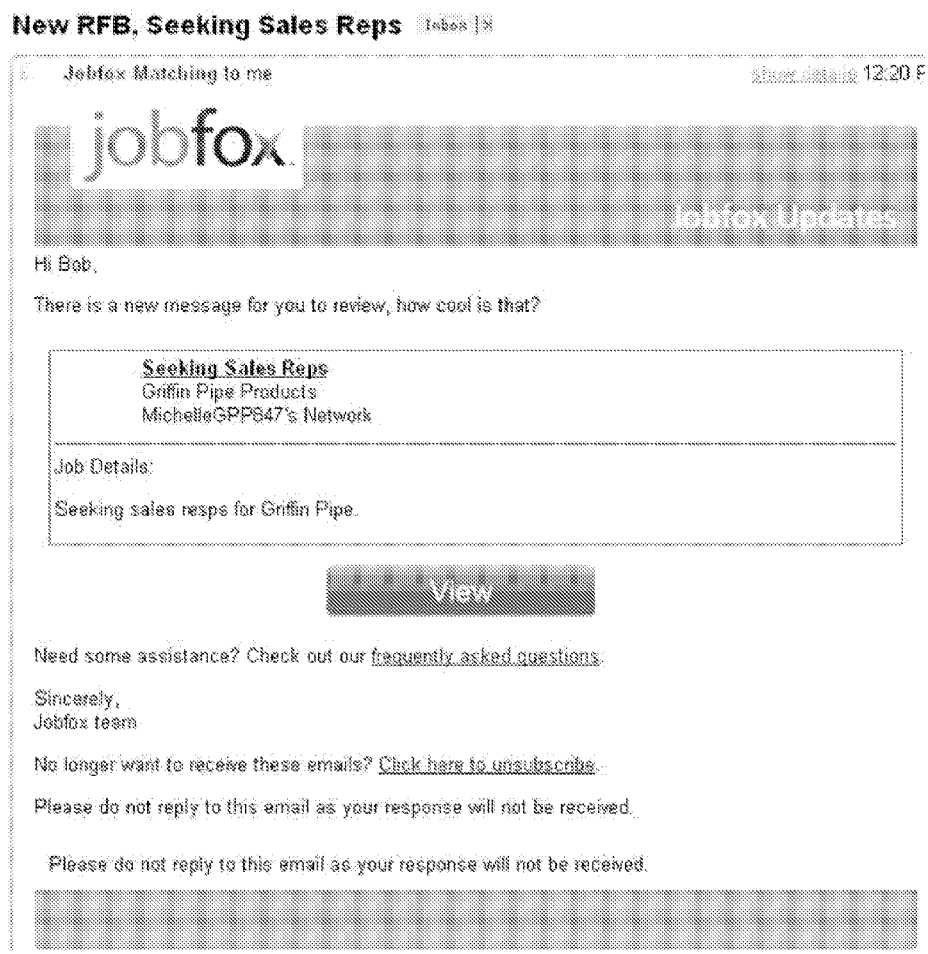
FIG. 13 depicts an exemplary screenshot of a screen for indicating the receipt of a referral request.

In block 1204, the employment system server 101 may receive responses to the RFB from the job seekers 104. The job seeker 104 may be notified of the RFB by, for example, an email sent to an account external to the employment system server 101, or by a notice added to the job seeker profile 203 that may be displayed to the job seeker 104 upon accessing the employment system server 101. FIG. 13 depicts an exemplary screenshot of a screen for indicating the receipt of a referral request. The job seeker 104 may view the RFB, including information about the job opening.

The job seeker 104 may respond to the RFB by indicating interest in the opening in the RFB, or by sending the RFB to another job seeker 104 who is not in the recruiter network 201. The job seeker 104 may also ignore the RFB. FIG. 14 depicts an exemplary screenshot of a screen for responding to a referral request. If the job seeker 104 is interested in the job opening, the job seeker 104 may send a response to the recruiter 105 indicating this interest, and the response may include, for example, a message to the recruiter 105 from the job seeker 104. If the job seeker 104 wants to send the RFB to a second job seeker 104 as a boost, thereby referring, or boosting, the second job seeker 104, the job seeker 104 may use the employment system server 101 to forward the RFB. The job seeker 104 may enter contact information for the second job seeker 104, and may add a message to the second job seeker 104. The job seeker 104 may also choose to forward the RFB anonymously so that the identity of the job seeker 104 is hidden from the second job seeker 104.

Figure 16:
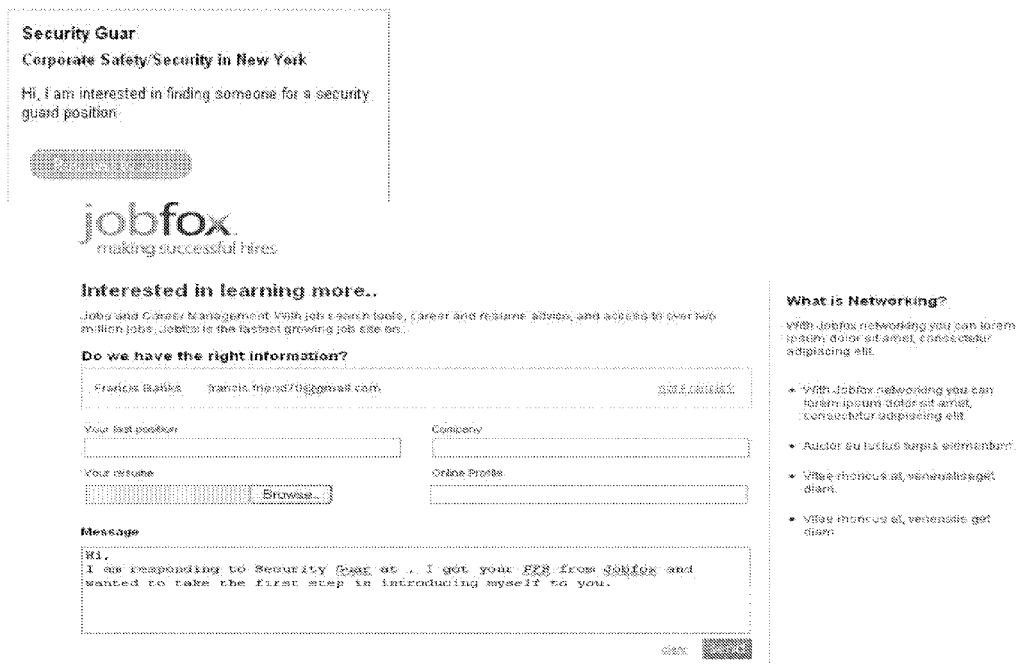
FIG. 16 depicts an exemplary screenshot of a screen for responding to a boost.

The second job seeker 104 may be notified of the boost by, for example, an email sent to an account external to the employment system server 101. FIG. 15 depicts an exemplary screenshot of a screen for indicating receipt of a referral request as a result of a boost. The notification of the boost may include the identity of the job seeker 104 who boosted the job seeker 104, and information about the job opening from the original RFB. The second job seeker 104 may respond to the boost by indicating interest in the job opening to the recruiter 105 or by requesting to join the recruiter network 201, or both. FIG. 16 depicts an exemplary screenshot of a screen for responding to a boost. The second job seeker 104 may access the employment system server 101, and may set up a job seeker profile 203 if the job seeker 104 does not already have a job seeker profile 203 in the user database 102.

Figure 17:
FIG. 17 depicts an exemplary screenshot of a response to an referral request from a boosted job seeker.

In block 1205, the employment system server 101 may display the responses to the recruiter 105. The recruiter 105 may view the responses from all of the job seekers 104 who respond to the RFB, indicating either interest in the job opening or requesting to join the recruiter network 201. The employment system server 101 may display to the recruiter 105 the job seeker profiles 203 for the job seekers 104 who responded along with the nature of the response, and any message added to the response. FIG. 17 depicts an exemplary screenshot of a response to a referral request from a boosted job seeker.

Figure 18:
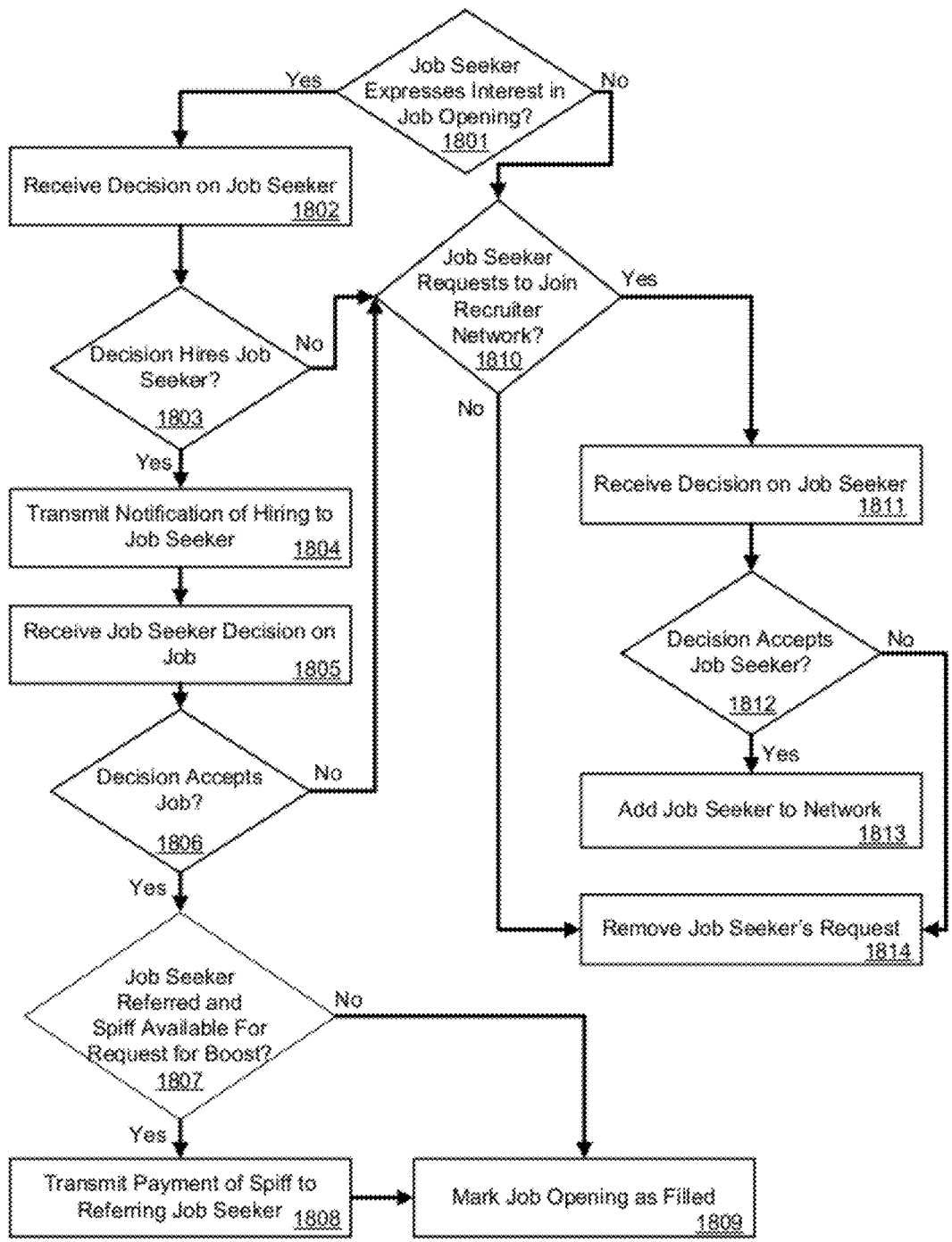
FIG. 18 depicts an exemplary procedure for receiving decisions on a response to a referral request.

FIG. 18 depicts an exemplary procedure for receiving decisions on a response to a referral request. In block 1801, the employment system server 101 may determine whether the job seeker 104 has expressed interest in the job opening from the RFB, or has only requested to join the recruiter network 201. If the job seeker 104 has expressed interest in the job opening, flow proceeds to block 1802. Otherwise flow proceeds to block 1810.

Figure 19:
FIG. 19 depicts an exemplary screenshot of a screen for viewing a job seeker who has responded to a referral request.

In block 1802, the employment system server 101 may receive a decision on the job seeker 104. The recruiter 105 may input into the employment system server 101 a decision on whether or not the job seeker 104 who expressed interest in the job opening will be hired to fill the job opening. The recruiter 105 may perform any necessary steps to make a hiring decision, including, for example, viewing the job seeker profile 203 for the job seeker 104, requesting additional information from the job seeker 104, arranging for interviews with the job seeker 104, contacting references for the job seeker 104, and negotiating with the job seeker 104. The recruiter 105 may undertake hiring decision steps for multiple job seekers 104 before inputting a hiring decision into the employment system server 101. FIG. 19 depicts an exemplary screenshot of a screen for viewing a job seeker who has responded to a referral request.

The recruiter 105 may also invite the job seeker 104 to join the recruiter network 201 if the job seeker 104 expressed interest in the job opening but did not request to join the recruiter network 201. The recruiter 105 may make the invitation regardless of whether or not the recruiter 105 hires the job seeker 104 for the job opening.

In block 1803, the employment system server 101 may determine whether the decision indicates that the job seeker 104 was hired or not. If the decision, for example, from the recruiter 105, hires the job seeker 104 to fill the job opening, flow proceeds to block 1804. Otherwise, flow proceeds to block 1810.

In block 1804, the employment system server 101 may transmit a notification to the job seeker 104 that the job seeker 104 has been hired to fill the job opening. The job seeker 104 may be notified of the hiring by, for example, an email sent to an account external to the employment system server 101, by a message sent to the job seeker 104 through the job seeker profile 203, or by any other suitable form of communication. Alternatively, the notification of the job seeker 104 may take place outside of the employment system server 101. For example, the recruiter 105 may directly call the job seeker 104, or send the notification to the job seeker 104 in the mail.

In block 1805, the employment system server 101 may receive a decision on accepting the job to fill the job opening made by the job seeker 104. The decision may be input to the employment system server 101 by the job seeker 104, or may be input by the recruiter 105. For example, the job seeker 104 may use any suitable input control, for example, an input control in a notification email, to indicate whether they accept the job or not. As another example, the job seeker 104 may notify the recruiter 105 that they accept the job directly, for example, by phone, and the recruiter 105 may then input this decision into the employment system server 101.

In block 1806, the employment system server 101 may determine whether the decision from the job seeker 104 accepts the job. If the job seeker 104 accepts the job, flow proceeds to block 1807. Otherwise, flow proceeds to block 1810.

In block 1807, the employment system server 101 may determine whether the job seeker 104 was referred, or boosted, for the job opening, and whether there is a spiff available for the RFB the job seeker 104 responded to. If the job seeker 104 was referred, and a spiff is available, flow proceeds to block 1808. Otherwise, flow proceeds to block 1809.

In block 1808, the spiff payment may be transmitted to the referring job seeker 104. The employment system server 101 may transmit the payment of the spiff, or may notify the recruiter 105 or other party responsible for the job opening to transmit payment to the referring job seeker 104. For example, if the job seeker 104 who accepted the job to fill the job opening was referred, or boosted, the job seeker 104 responsible for the boost may be the referring job seeker 104, and may be owed a spiff payment. Payment may be transmitted using, for example, contact details in the job seeker profile 203 for the job seeker 104, or in any other suitable manner.

In block 1809, the employment system server 101 may mark the job opening for which the job seeker 104 was hired as filled. The employment system server 101 may mark the job opening in the jobs database 103 as filled, or may alternatively remove the job opening from the jobs database 103.

In block 1810, the employment system server 101 may determine if the job seeker 104 has requested to join the recruiter network 201. If the job seeker 104 has requested to join the recruiter network 201, flow proceeds to block 1811. Otherwise flow proceeds to block 1814.

In block 1811, the employment system server 101 may receive a decision on the request from the job seeker 104. The decision may be made by auto-acceptance rules for the recruiter network 201 or by the recruiter 105, as discussed previously.

In block 1812, the employment system server 101 may determine if the decision accepts the job seeker 104. If the decision accepts the job seeker 104, flow proceeds to block 1813. Otherwise flow proceeds to block 1814.

In block 1813, the job seeker 104 may be joined to the recruiter network 201. If the job seeker 104 received a boost or received the RFB as part of the house network 301, then the job seeker 104 may not have been part of the recruiter network 201. The job seeker profile 203 for the job seeker 104 may be associated with the recruiter profile 202, joining the job seeker 104 to the recruiter network 201.

In block 1814, the employment system server 101 may remove the request from the job seeker 104. The request from the job seeker 204 may no longer be displayed to the recruiter 105, as previously discussed.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A system for social recruiting comprising:
    an employment system server comprising at least one user database;
    the user database comprising at least one recruiter profile and at least one job seeker profile, wherein a recruiter network for the at least one recruiter profile comprises the at least one recruiter profile associated with the at least one job seeker profile,
    wherein the employment server is configured to hide the recruiter network from a job seeker profile that does not match a criteria for the recruiter network so that a request cannot be made to associate the job seeker profile with the recruiter profile.

2. The system of claim 1, wherein the at least one job seeker profile in the recruiter network is not associated with another job seeker profile in the recruiter network.

3. The system of claim 1, wherein a house network comprises the at least one job seeker profile associated with the house network.

4. The system of claim 3, wherein a first job seeker profile and a second job seeker associated with the house network share a common attribute.

5. The system of claim 1, wherein the employment system server is configured to receive a referral request and send the referral request to at least one job seeker profile associated with the recruiter profile.

6. The system of claim 5, where the referral request is a request for boost.

7. The system of claim 5, wherein the referral request includes a spiff.

8. The system of claim 5 wherein the referral request includes a job opening.

9. The system of claim 5, wherein the employment system server is configured receive a referral in response to the referral request of a party with no job seeker profile or with a job seeker profile that is not associated with the recruiter profile.

10. The system of claim 9, wherein the referral is anonymous.

11. The system of claim 9, wherein the employment system server is configured to pay a spiff to a job seeker associated with the job seeker profile that sent the referral is the referred party is hired.

12. The system of claim 1, wherein the employment system server is configured to receive a request to associate a job seeker profile with a recruiter profile.

13. The system of claim 12, wherein the employment system server is configured to decide on the request using at least one auto-acceptance rule.

* * * * *